(12) United States Patent
Song et al.

(10) Patent No.: US 9,907,076 B2
(45) Date of Patent: Feb. 27, 2018

(54) METHOD AND APPARATUS FOR CONTROLLING INTERFERENCE IN WIRELESS COMMUNICATION SYSTEM

(71) Applicant: Samsung Electronics Co., Ltd., Suwon-si, Gyeonggi-do (KR)

(72) Inventors: Seongwook Song, Seoul (KR); Taeyoon Kim, Seongnam-si (KR); Jonghan Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 14/304,157

(22) Filed: Jun. 13, 2014

(65) Prior Publication Data

US 2014/0370907 A1     Dec. 18, 2014

Related U.S. Application Data

(60) Provisional application No. 61/834,542, filed on Jun. 13, 2013.

(30) Foreign Application Priority Data

Jul. 8, 2013 (KR) .................. 10-2013-0079939

(51) Int. Cl.
*H04W 72/08* (2009.01)
*H04J 11/00* (2006.01)

(52) U.S. Cl.
CPC ......... *H04W 72/082* (2013.01); *H04J 11/005* (2013.01)

(58) Field of Classification Search
CPC ................................................ H04W 72/082
See application file for complete search history.

(56) References Cited

U.S. PATENT DOCUMENTS

| 8,346,173 | B2 | 1/2013 | Chen et al. |
| 2008/0064432 | A1 | 3/2008 | Park et al. |
| 2010/0255852 | A1 | 10/2010 | Chen et al. |
| 2011/0143674 | A1* | 6/2011 | Lim .................... H04W 72/082 |
| | | | 455/63.1 |

(Continued)

FOREIGN PATENT DOCUMENTS

| EP | 1 936 829 A1 | 6/2008 |
| EP | 2 280 492 A1 | 2/2011 |

(Continued)

*Primary Examiner* — Mazda Sabouri
(74) *Attorney, Agent, or Firm* — Jefferson IP Law, LLP (57) ABSTRACT

A method and an apparatus for controlling interference in a wireless communication system are provided. The method for controlling interference by a Base Station (BS) in a wireless communication system includes receiving an interfering cell signal transmitted by an interfering cell located adjacent to the BS, acquiring interference information based on the received interfering cell signal, and transmitting the acquired interference information to a User Equipment (UE). Because the BS acquires interference information between the BS and a neighboring cell and transmits the acquired interference information to the UE, the UE can effectively cancel interference at a cell edge area and the like, so that the system throughput of the entire wireless network can be significantly increased.

12 Claims, 11 Drawing Sheets

(56) References Cited

U.S. PATENT DOCUMENTS

| | | | |
|---|---|---|---|
| 2011/0287775 A1* | 11/2011 | Fan | H04W 72/082 455/452.1 |
| 2012/0008511 A1* | 1/2012 | Fan | H04B 1/7107 370/252 |
| 2012/0264445 A1* | 10/2012 | Lee | H04W 28/048 455/452.1 |
| 2013/0003580 A1 | 1/2013 | Kovacs et al. | |
| 2013/0077578 A1 | 3/2013 | Wang et al. | |
| 2013/0115999 A1 | 5/2013 | Sirotkin et al. | |
| 2013/0121168 A1 | 5/2013 | Luo et al. | |
| 2013/0170423 A1 | 6/2013 | Abe et al. | |
| 2013/0229985 A1 | 9/2013 | Kim et al. | |
| 2013/0242771 A1* | 9/2013 | Ohta | H04B 7/15585 370/252 |
| 2015/0110025 A1* | 4/2015 | Chae | H04B 7/024 370/329 |

FOREIGN PATENT DOCUMENTS

| | | |
|---|---|---|
| JP | 2012-5079 A | 1/2012 |
| KR | 10-2012-0047774 A | 5/2012 |

\* cited by examiner

METHOD AND APPARATUS FOR CONTROLLING INTERFERENCE IN WIRELESS COMMUNICATION SYSTEM

CROSS-REFERENCE TO RELATED APPLICATION(S)

This application claims the benefit under 35 U.S.C. § 119(e) of a U.S. Provisional application filed on Jun. 13, 2013 in the U.S. Patent and Trademark Office and assigned Ser. No. 61/834,542, and under 35 U.S.C. § 119(a) of a Korean patent application filed on Jul. 8, 2013 in the Korean Intellectual Property Office and assigned Serial number 10-2013-0079939, the entire disclosure of each of which is hereby incorporated by reference.

TECHNICAL FIELD

The present disclosure relates to a wireless communication system. More particularly, the present disclosure relates to a method and an apparatus for controlling interference in a Base Station (BS), and a method and an apparatus for controlling interference in a User Equipment (UE).

BACKGROUND

Typically, a wireless communication system has been developed to provide voice services while allowing for mobility of a user. The wireless communication system has gradually expanded in service scope from voice to data services. Currently, the wireless communication system has evolved to a degree that it may provide high-speed data services in addition to voice services. However, currently, the wireless communication system that provides services suffers from a lack of resources, and users require the wireless communication system to provide increasingly higher-speed services to them. Accordingly, there is a necessity for more advanced wireless communication systems.

In the wireless communication system, a signal from a neighboring cell may act as interference in the reception of a signal from a serving cell (i.e., a serving Base Station (BS)) at a cell edge area and the like. Accordingly, in the wireless communication system, an interference signal from the neighboring cell is a factor which degrades data transmission from the serving cell.

In an actual commercial wireless network, a large area is affected by an interference signal, and thus may significantly affect the system throughput of the entire wireless network.

Therefore, there is a growing need for a method capable of effectively processing an interference signal at a cell edge area and the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus, in which a Base Station (BS) acquires interference information between the BS and a neighboring cell and transmits the acquired interference information to a User Equipment (UE).

In accordance with an aspect of the present disclosure, a method for controlling interference by a BS in a wireless communication system is provided. The method includes receiving an interfering cell signal transmitted by an interfering cell located adjacent to the BS, acquiring interference information based on the received interfering cell signal, and transmitting the acquired interference information to a UE.

In accordance with another aspect of the present disclosure, a BS for controlling interference in a wireless communication system is provided. The BS includes a transmitter/receiver configured to transmit and receiving signals to and from one of a neighboring BS and a UE and a controller configured to receive an interfering cell signal transmitted by an interfering cell located adjacent to the BS, to acquire interference information based on the received interfering cell signal, and to transmit the acquired interference information to the UE.

In accordance with still another aspect of the present disclosure, a method for canceling interference by a UE in a wireless communication system is provided. The method includes receiving interference information acquired by a serving cell of the UE from the serving cell, canceling an interference signal from a reception signal received by the UE based on the interference information, and processing the reception signal from which the interference signal is cancelled.

In accordance with yet another aspect of the present disclosure, a UE for canceling interference in a wireless communication system is provided. The UE includes a transmitter/receiver configured to transmit and receiving signals to and from a BS and a controller configured to receive interference information acquired by a serving cell of the UE from the serving cell, to cancel an interference signal from a reception signal received by the UE based on the interference information, and to process the reception signal from which the interference signal is cancelled.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
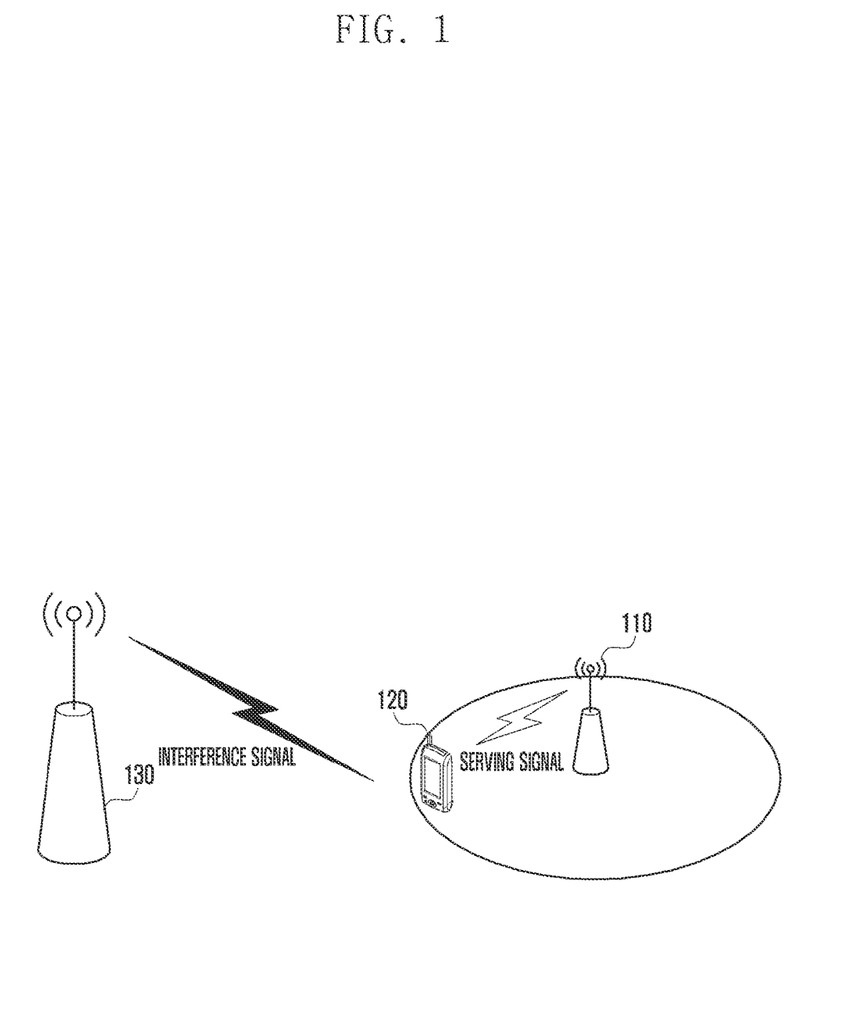
FIG. 1 is a view illustrating a situation in which a User Equipment (UE) located at a cell edge is subject to interference from a neighboring cell in a wireless communication system according to an embodiment of the present disclosure.

FIG. 1 is a view illustrating a situation in which a UE located at a cell edge is subject to interference from a neighboring cell in a wireless communication system according to an embodiment of the present disclosure.

Referring to FIG. 1, a serving cell (i.e., a serving Base Station (BS)) 110 provides a service to a User Equipment (UE) 120 located in a service area thereof. A signal that the serving cell 110 transmits to the UE 120 may be referred to as a "serving signal" or "desired signal."

In operation, the service area of the serving cell 110 may overlap that of a neighboring cell 130. The overlapping area may be referred to as a "cell edge area."

When the UE 120 is located in the cell edge area, the UE 120 may receive a serving signal transmitted by the serving cell 110 thereof and simultaneously, may receive a signal transmitted by the neighboring cell 130. A signal that the UE 120 receives from the neighboring cell 130 is a signal that the neighboring cell 130 transmits to a served UE thereof. In this regard, the signal may act as interference to the UE 120 which receives a service from the serving cell 110.

When information on an interference signal is provided to the UE 120, the UE 120 may improve reception performance through an interference cancellation reception apparatus and the like by using the information on the interference signal.

Embodiments of the present disclosure propose a method for effectively canceling interference from the neighboring cell by the UE.

Figure 2:
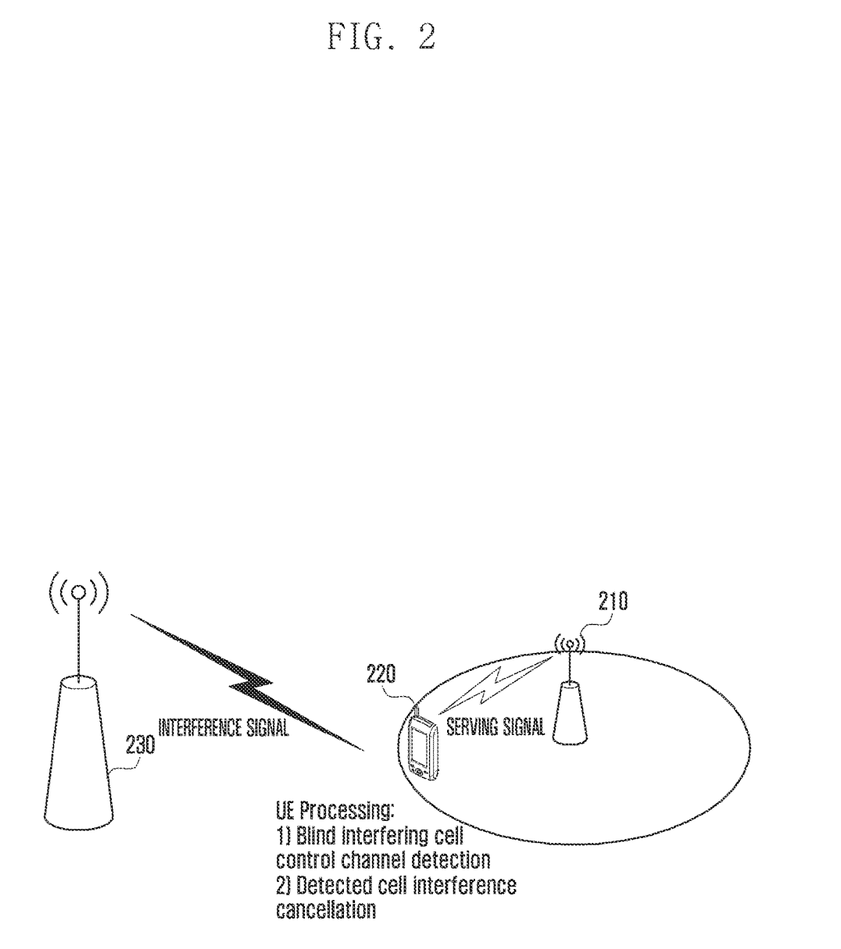
FIG. 2 is a view illustrating a method for canceling interference according to an embodiment of the present disclosure.

FIG. 2 is a view illustrating a method for canceling interference according to an embodiment of the present disclosure.

Referring to FIG. 2, when a UE 220 sends a request for connecting to a network to a serving cell 210, the serving cell 210 assigns a Radio Network Temporary Identifier (RNTI), which is an identifier for identifying a UE, to the UE 220, and generates a control channel by using the assigned RNTI. Thus, FIG. 2 illustrates UE processing of blind interfering cell control channel detection and detected cell interference cancellation.

Then, the UE 220 demodulates the control channel transmitted from the serving cell 210 based on the RNTI assigned thereto, and processes a related data channel based on efficient control information when the efficient control information is included in the control channel.

Because the UE 220 is located in a cell edge area as illustrated in FIG. 2, the UE 220 may also receive an interference signal from a neighboring cell 230. However, the UE 220 does not have RNTI information of an interfering UE to be currently scheduled, namely, a UE which receives a service from the neighboring cell 230. Accordingly, the UE 220 is not capable of demodulating a control channel for the interference signal from the neighboring cell 230.

A Long Term Evolution (LTE) wireless communication system is capable of blind-decoding a control channel through an exhaustive search by using a combination of resources according to various RNTIs of a control channel.

In an embodiment of the present disclosure, the UE 220 may acquire control channel information included in an interference signal through blind decoding. When acquiring the control channel, the UE 220 may acquire modulation information of a cell data channel, Precoding Matrix Index (PMI) information, and the like, and may cancel the interference signal from a serving signal based on the acquired pieces of information.

The above-described method is problematic in that a control channel detection false alarm rate may increase as the number of blind searches increases. Accordingly, there is concern about the degradation of reception performance due to processing a serving signal based on incorrect interference information.

Also, there is concern about the degradation of detection performance due to the UE 220, which operates in a relatively low Signal-to-Interference Ratio (SIR) region because the serving signal acts as strong interference to an interference signal.

Figure 3:
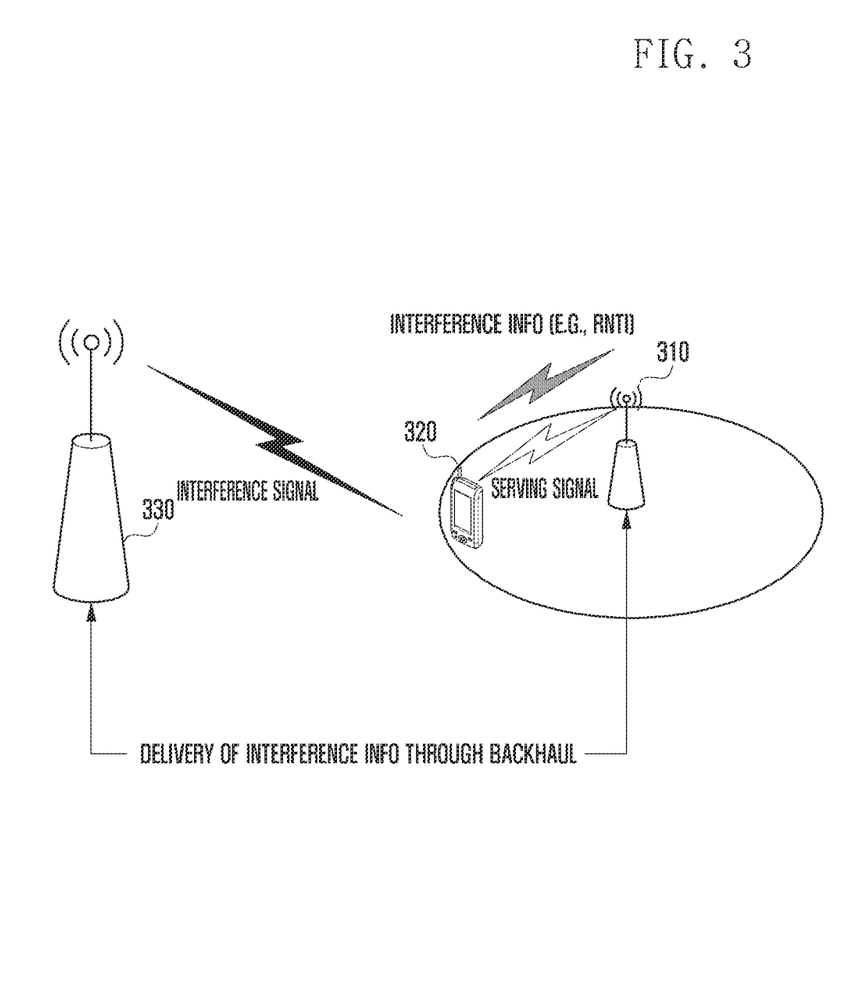
FIG. 3 is a view illustrating a method for canceling interference according to another embodiment of the present disclosure.

FIG. 3 is a view illustrating a method for canceling interference according to another embodiment of the present disclosure.

In another embodiment of the present disclosure as illustrated in FIG. 3, a serving cell 310 receives interference information delivered by an interfering cell 330.

Referring to FIG. 3, the serving cell 310 may receive the interference information through a wired backhaul network and the like. Also, the serving cell 310 may transmit the interference information to a UE 320 through a wireless channel. In other words, FIG. 3 illustrates UE processing interference info, detection from the Broadcast Control Channel (BCH) or Common Control Channel (CCH) from the serving cell and detected other cell interference cancellation. Additionally, the serving cell processing of receiving the interference information via backhaul from interfering cells and transmitting the interference information to the UEs on the BCH or CCH.

More specifically, another embodiment of the present disclosure as illustrated in FIG. 3 is a method in which the interfering cell 330 delivers information on RNTI and the like of an interfering UE in the interfering cell 330, which may act as interference to the UE 320, to the serving cell 310 via an individual interface between BSs.

Then, the UE 320 may cancel interference based on the interference information received from the serving cell 310.

As compared with an embodiment of the present disclosure as illustrated in FIG. 2, another embodiment of the present disclosure as illustrated in FIG. 3 does not have a problem of a detection error in a blind decoding method, and thus is advantageous in that the UE 320 may use reliable interference information.

On the other hand, when performance restrictions such as a data rate of backhaul, the delay thereof, and the like exist between the UE 320 and a macro-BS in a small cell and the like, it may be difficult to apply another embodiment of the present disclosure as illustrated in FIG. 3 to this case. Also, in order to transmit interference information, the serving cell 310 may need the use of additional wireless channel resources.

Figure 4:
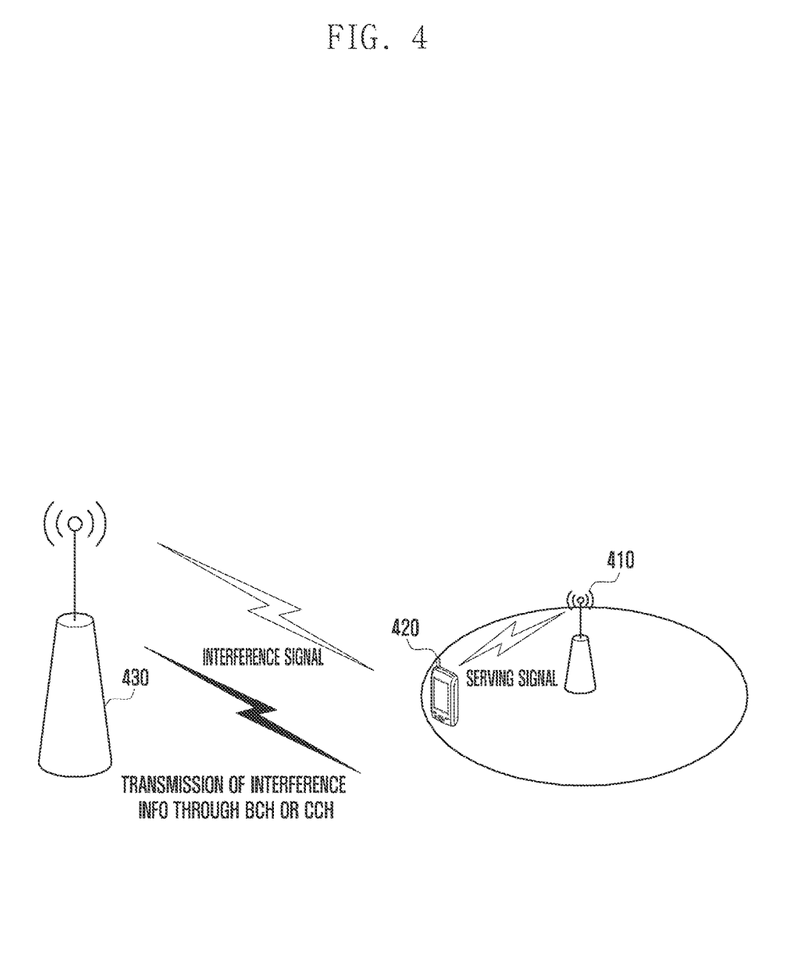
FIG. 4 is a view illustrating a method for canceling interference according to still another embodiment of the present disclosure.

FIG. 4 is a view illustrating a method for canceling interference according to still another embodiment of the present disclosure.

Referring to FIG. 4, a method in which an interfering cell 430 transmits interference information directly to a UE 420 through a wireless channel of the interfering cell 430 is illustrated. The UE 420 may acquire the interference information transmitted by the interfering cell 430, and may cancel interference based on the acquired interference information. In other words, FIG. 4 illustrates UE processing of interference information, detection from the BCH or CCH from the interfering cells and detecting other cell interference cancellation.

As compared with another embodiment of the present disclosure as illustrated in FIG. 3, still another embodiment of the present disclosure as illustrated in FIG. 4 is advantageous in that it does not need backhaul.

On the other hand, because a dedicated channel does not exist between the interfering cell 430 and the UE 420, the interfering cell 430 delivers the interference information to the UE 420 through a common control channel of the interfering cell 430 or a broadcast channel. Accordingly, a BS is disadvantageous in that the BS needs to always operate an additional channel. Also, because a signal from the interfering cell 430 is smaller in received signal strength than a signal from a serving cell 410, the performance of detecting a control channel may be lower than the performance of detecting a serving control channel.

Hereinafter, a method for canceling interference, which may solve all of the problems indicated in FIGS. 2 to 4, will be described.

First, the problems in the embodiments described in FIGS. 2 to 4 will be briefly described as follows.

In an embodiment of the present disclosure as illustrated in FIG. 2, because a signal from the interfering cell is detected, from the viewpoint of the interfering cell, the UE 220 operates in a low received Signal-to-Interference Ratio (SIR) region, and the number of cases of a blind search greatly increases as compared with a case of the serving cell 210. Accordingly, miss-detection and a false alarm rate may increase, so that the reception performance of the UE 220 may degrade.

In another embodiment of the present disclosure as illustrated in FIG. 3, because information is received through a wired network between BSs, an error may be small, but performance degradation may occur due to a data rate of backhaul and the delay thereof. Also, a problem may occur in that the serving cell 310 needs the use of additional wireless channel resources.

In still another embodiment of the present disclosure as illustrated in FIG. 4, a dedicated channel from the interfering cell 430 to the target UE 420 does not exist, and thus interference information needs to be delivered through a common control channel or a broadcast channel. Accordingly, when multiple UEs exist in an interference area such as a cell edge and the like, the required amount of wireless resources may greatly increase. Also, because the performance of receiving a channel from the interfering cell 430 is lower than the performance of receiving a control channel from the serving cell 410, a delivery error of interference information may be large.

In order to solve the above-described problems, an operation of a BS and that of a UE that embodiments of the present disclosure propose will be described as follows.

First, from the viewpoint of a BS, a serving cell may receive a DownLink (DL) signal from an interfering cell, and may detect characteristics of an interference signal or interference information. According to embodiments of the present disclosure, the interference information that the BS has detected may include at least one of a cell IDentifier (ID) of the interference signal, modulation information, an RNTI, and Resource Block (RB) allocation information.

When the BS rather than the UE detects the interference signal or interference information as described above, factors such as the placement of antennas (e.g., the height of an antenna and a distance between antennas) in the BS, and the like may bring about the performance of detecting interference information, which is more improved than the method for detecting interference information by the UE.

Also, in the method for detecting interference information by the UE, a signal from the serving cell acts as interference during the detection of the interference information, and thus the performance of detecting the interference information may be degraded.

On the other hand, when the BS detects interference information, a DL signal from the serving cell acts as interference to a DL receiver of the serving cell through multi-path channel, and this interference is referred to as "self-interference." However, the BS may autonomously store information on a DL transmission signal, and may effectively cancel self-interference by using the stored information. Accordingly, the method for detecting interference information by the BS may have superior detection performance to that of the method for detecting interference information by the UE.

Also, according to an embodiment of the present disclosure, the BS may manage the detected interference information according to the strength of an interference signal, the direction thereof, or the like, and may select and manage interference information affecting the connected target UE.

Also, according to an embodiment of the present disclosure, the BS may deliver the acquired interference information to the UE through a channel, such as a dedicated channel, a common control channel, a broadcast channel, and the like.

When the dedicated channel is used, interference information affecting a target UE, which has been selected through the management of interference information, may be delivered to the target UE. Alternatively, when the interference information is delivered through the common control channel or broadcast channel, multiple UEs monitor the channel, and thus multiple pieces of interference information corresponding to this case may be delivered.

According to an embodiment of the present disclosure, from the viewpoint of a UE, the UE may receive interference information from a serving cell.

The target UE receives interference information from the serving cell, and monitors an interference signal included in a received signal based on the received interference information. For example, when information on an RNTI set related to an interfering cell is delivered to the UE, the target UE detects a control channel corresponding to the RNTI set. When the control channel is successfully detected, the target UE may cancel interference based on multiple pieces of information, which may be acquired through the control channel.

For example, when detecting a control channel included in an interference signal from the interfering cell, the target UE may acquire modulation information, PMI information, and the like included in the control channel, and may cancel interference based on the acquired pieces of information.

Hereinafter, the above-described embodiments of the present disclosure will be described in detail with reference to the accompanying drawings.

Figure 5:
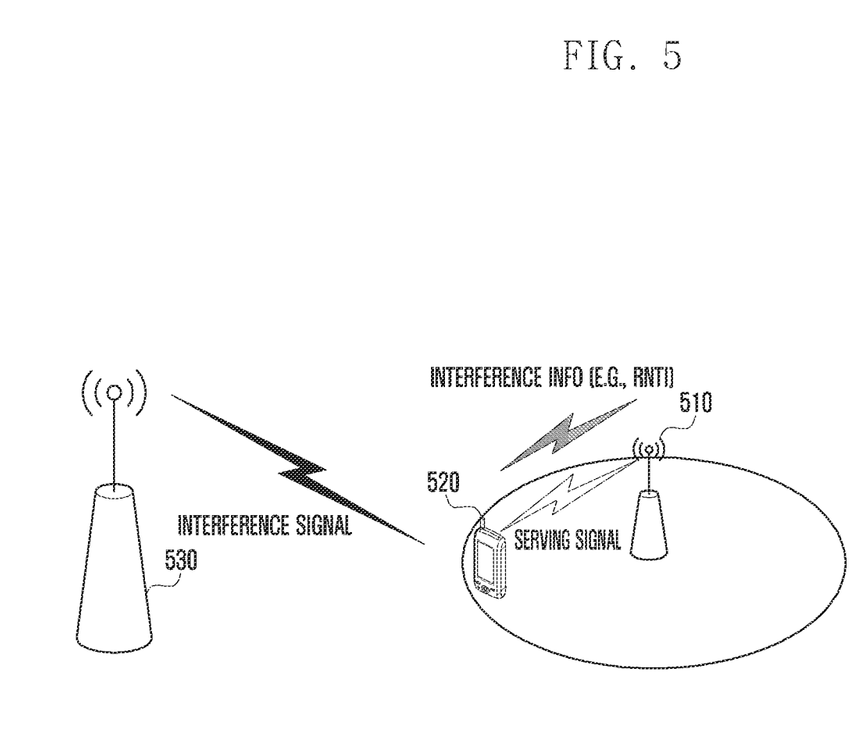
FIG. 5 is a view illustrating a method for controlling interference by a BS according to an embodiment of the present disclosure.

FIG. 5 is a view illustrating a method for controlling interference by a BS according to an embodiment of the present disclosure.

As described above, in embodiments of the present disclosure, a serving cell may control interference in a scheme for directly acquiring interference information on a neighboring cell (i.e., an interfering cell) and delivering the acquired interference information to a UE.

Referring to FIG. 5, according to an embodiment of the present disclosure, a serving cell (or a serving BS) 510 may have a self-interference cancellation function. In other words, FIG. 5 illustrates UE processing of interference information detection from a BCH or CCH from the serving cell and detected other cell interference cancellation. Additionally, the serving cell processing includes self interference cancellation, other cell control channel blind detection, interference information extraction from the received interference, and transmitting the interference information to UEs on the BCH or CCH.

A DL signal from a serving cell acts as interference to a DL receiver of the serving cell through a multi-path channel, and this interference is referred to as "self-interference." When the serving cell 510 needs to acquire an interference signal transmitted by an interfering cell 530, a DL signal from the serving cell 510 acts as interference. According to an embodiment of the present disclosure, the serving cell 510 may autonomously store information on a DL transmission signal, and thus may cancel the self-interference based on the stored information.

Also, according to an embodiment of the present disclosure, the serving cell 510 may blind-detect an interfering channel, and may extract interference information. According to an embodiment of the present disclosure, the serving cell 510 may extract the interference information through a blind detection process described below.

When an RNTI has been determined for a particular UE, a UE or a BS determines a resource region, to which information on the relevant UE is mapped in an entire wireless resource region. However, according to an embodiment of the present disclosure, because an RNTI is in a state where it cannot be known, the serving cell 510 decodes a particular resource region. By performing the decoding, the serving cell 510 determines an RNTI for the particular resource region. Depending on whether the determined RNTI is compatible with an RNTI previously determined for the particular resource region, the serving cell 510 may determine whether the decoding is successful.

For example, consideration is given to a case in which RNTIs capable of being mapped to a resource region A are previously determined as 1, 3 and 5 in terms of a system. In this case, when the serving cell 510 performs a blind detection process on the resource region A and an RNTI acquired by performing the blind detection process is 2, the serving cell 510 may determine that the relevant blind detection is meaningless. In contrast, when the serving cell 510 performs the blind detection process on the resource region A and an RNTI acquired by performing the blind detection process is 5, the serving cell 510 may determine that the relevant blind detection is successful.

When the blind detection is successful, the serving cell 510 may receive and process an interference signal transmitted by the interfering cell 530 based on the acquired RNTI. In other words, when the serving cell 510 decodes the interference signal based on the acquired RNTI, the serving cell 510 may acquire control information on a predetermined interfering UE included in the interference signal. The control information may include at least one of a cell ID of the interference signal, modulation information, an RNTI, and RB allocation information. At least one of the acquired pieces of control information may be referred to as "interference information."

Then, the serving cell 510 transmits the interference information to the served UE 520 thereof. According to an embodiment of the present disclosure, the serving cell 510 may transmit the interference information to the served UE 520 through a broadcast channel, a common control channel, or a dedicated channel.

When receiving the interference information from the serving cell 510, the UE 520 may detect an interference signal based on the interference information. The UE 520 may interpret an interference signal by using the interference information. Accordingly, the UE 520 may cancel the interference signal from received signals (i.e., signals including both a serving signal and the interference signal) that the UE 520 has received, and thereby may detect only the serving signal.

According to an embodiment of the present disclosure as illustrated in FIG. 5, an interference information extraction apparatus is added to the BS, and the delivery of interference through wired backhaul is cancelled. Also, the interference information is delivered to the UE 520 served by the serving cell 510, through a wired channel of the serving cell 510. Accordingly, wireless resources of the neighboring cell 530 are not additionally required.

Figure 6:
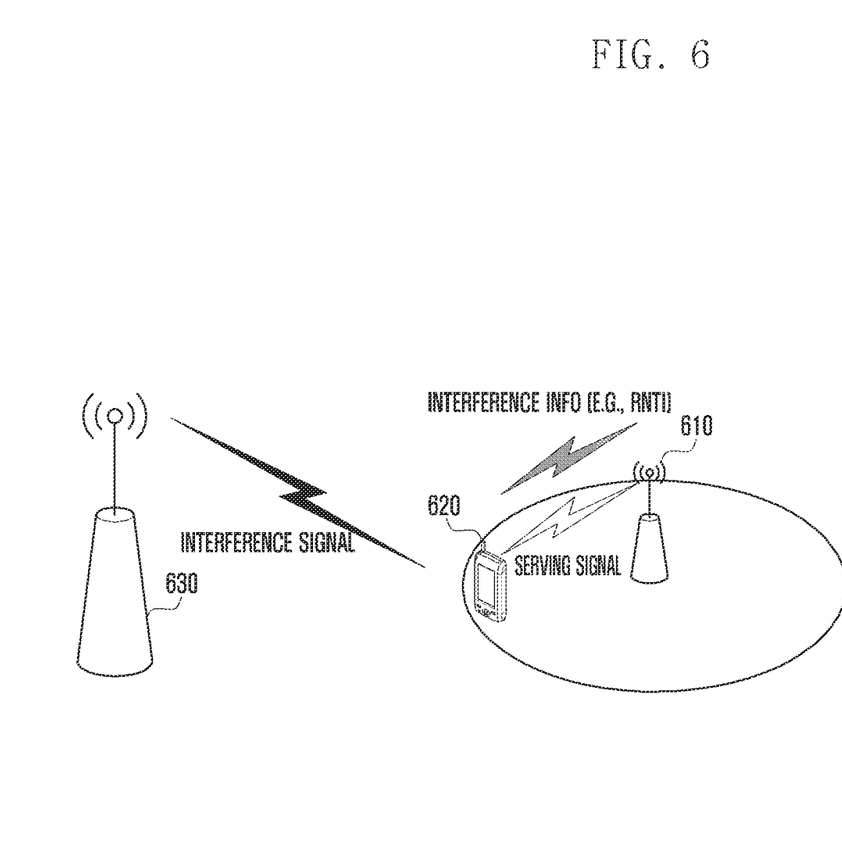
FIG. 6 is a view illustrating a method for controlling interference by a BS according to another embodiment of the present disclosure.

FIG. 6 is a view illustrating a method for controlling interference by a BS according to another embodiment of the present disclosure.

Another embodiment of the present disclosure as illustrated in FIG. 6 is different from an embodiment of the present disclosure as illustrated in FIG. 5, in that not all but only some pieces of interference information required for the cancellation of interference by a UE are received from a serving cell.

Also, after the UE detects remaining interference information through an interference information detection unit thereof, the UE may cancel an interference signal based on the interference information provided by the BS and the interference information detected by the UE.

Hereinafter, another embodiment of the present disclosure will be described in detail with reference to FIG. 6.

Referring to FIG. 6, consideration is given to a case in which a serving cell 610 has a self-interference cancellation function. The self-interference cancellation has been described above, and thus a detailed description thereof will be omitted. In other words, FIG. 6 illustrates UE processing including interference information detection from the BCH or CCH from the serving cell, blind detection for the residual interference information, and detecting other cell interference cancellation. Additionally, the serving cell processing includes self interference cancellation, other cell control channel blind detection, interference information extraction from the received interference, transmitting the partial interference information (e.g., semi-static information) to UEs on the BCH or CCH.

The serving cell 610 may blind-detect an interfering channel, and may extract interference information. According to another embodiment of the present disclosure, the serving cell 610 may extract the interference information through a blind detection process described below. The blind detection process has also been described above, and thus a detailed description thereof will be omitted.

When the blind detection is successful, the serving cell 610 may receive and process an interference signal transmitted by the interfering cell 630 based on the acquired RNTI. In other words, when the serving cell 610 decodes the interference signal based on the acquired RNTI, the serving cell 510 may acquire control information on a predetermined interfering UE included in the interference signal. The control information may include at least one of a cell ID of the interference signal, modulation information, an RNTI, and RB allocation information. At least one of the acquired pieces of control information may be referred to as "interference information."

Then, the serving cell 610 may determine interference information to be transmitted to the served UE 620 thereof from among the acquired pieces of interference information. For example, although the serving cell 610 has acquired the cell ID of the interference signal, the modulation information, the RNTI, the RB allocation information, and the like, the serving cell 610 may determine that only the RNTI information from among the acquired pieces of interference information is to be transmitted to the served UE 620. When the serving cell 610 transmits not all, but only some of the acquired pieces of interference information to the UE 620 as described above, it is advantageous in that wireless resources of the serving cell 610 may be saved.

The serving cell 610 may transmit the determined interference information to the served UE 620 through a broadcast channel, a common control channel, or a dedicated channel. In another embodiment of the present disclosure, consideration is given to a case in which the serving cell 610 transmits the RNTI information to the served UE 620.

Then, the UE 620 may cancel an interference signal based on the interference information transmitted by the serving cell 610. For example, the UE 620 decodes the interference signal based on the RNTI information received from the serving cell 610. Next, the UE 620 may extract control information included in the interference signal, and simultaneously, may acquire a cell ID of the interference signal, modulation information, RB allocation information, and the like, which are included in the extracted control information.

Then, the UE 620 may cancel the interference signal from received signals (i.e., signals including both a serving signal and the interference signal) that the UE 620 has received, and thereby may detect only the serving signal.

Figure 7:
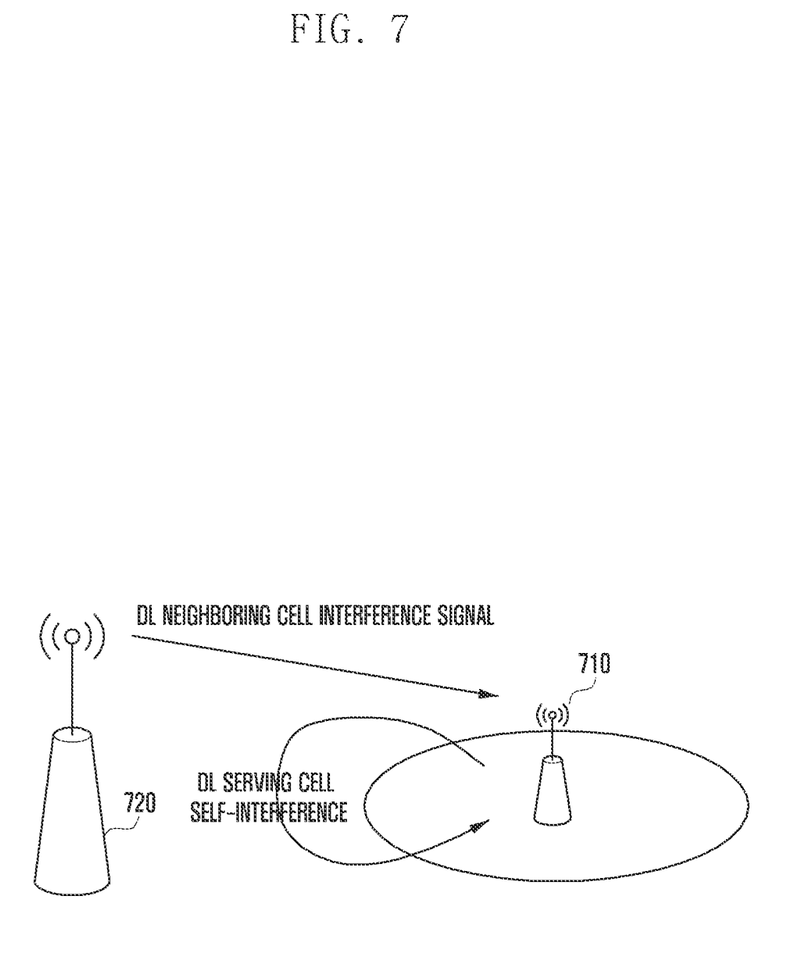
FIG. 7 is a view for explaining self-interference according to another embodiment of the present disclosure.

FIG. 7 is a view for explaining self-interference according to another embodiment of the present disclosure.

Figure 8:
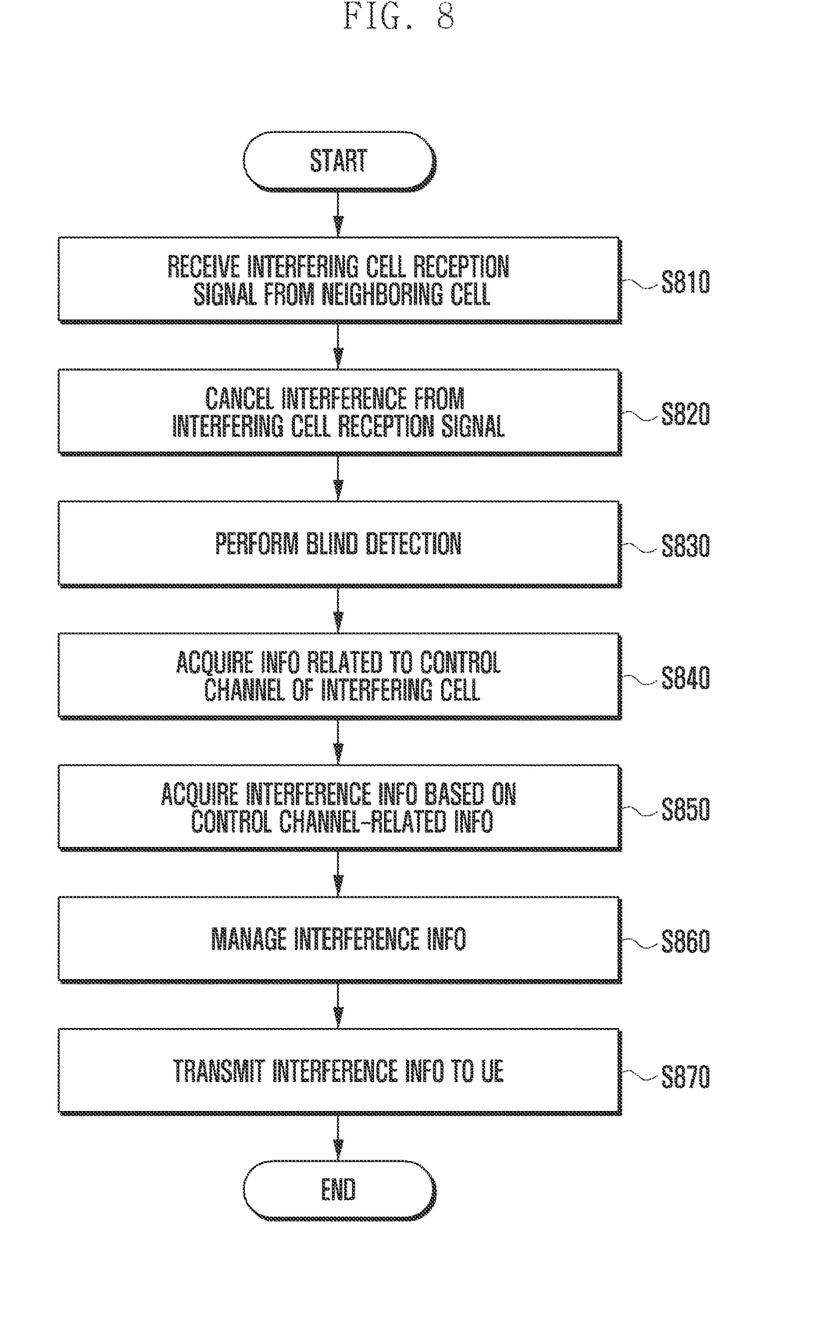
FIG. 8 is a flowchart illustrating the sequence of operations of a Base Station (BS) (i.e., a serving cell) according to an embodiment of the present disclosure.

FIG. 8 is a flowchart illustrating the sequence of operations of a BS (i.e., a serving cell) according to an embodiment of the present disclosure.

Referring to FIGS. 7 and 8, in operation S810, a BS 710 receives an interfering cell reception signal from a neighboring cell 720. Examples of the interfering cell reception signal may include a signal received from the neighboring cell 720 and a DL signal of the BS 710.

In operation S820, the BS 710 cancels interference from the received interfering cell reception signal. The BS 710 intends to extract a signal transmitted by the neighboring cell 720, and intends to acquire control information transmitted by the neighboring cell 720. Accordingly, the interference that the BS 710 cancels in operation S820 is the DL signal of the BS 710. According to an embodiment of the present disclosure, the BS 710 may cancel the interference through a self-interference cancellation process.

In operation S830, the BS 710 performs blind detection. The BS 710 performs decoding on a particular resource region as described above, and may determine whether the blind detection is successful, based on whether an RNTI acquired by performing the decoding is compatible with a preset RNTI set.

When the blind detection is successful, the BS 710 proceeds to operation S840, and acquires information related to a control channel of the interfering cell. Specifically, the BS 710 may acquire the control channel transmitted by the interfering cell, and may acquire at least one of a cell ID of an interference signal, modulation information, an RNTI and RB allocation information, which are included in the acquired control channel, in operation S850. The acquired pieces of information may be referred to as "interference information," as described above.

Then, the BS 710 proceeds to operation S860, and manages the acquired interference information. According to an embodiment of the present disclosure, in order to manage the interference information, the BS 710 may distinguish, classify and manage an interference signal interfering with each UE for each UE located within a cell radius of the BS.

Next, the BS 710 proceeds to operation S870, and may transmit the acquired interference information to the UE. According to an embodiment of the present disclosure, the BS 710 may transmit the interference information to the UE through any one of a common control channel, a broadcast channel, and a dedicated cannel.

Further, according to various embodiments of the present disclosure, the BS 710 may transmit all of the acquired pieces of interference information to the UE, or may extract only some pieces of interference information from the acquired pieces of interference information and may transmit the some pieces of interference information to the UE.

Figure 9:
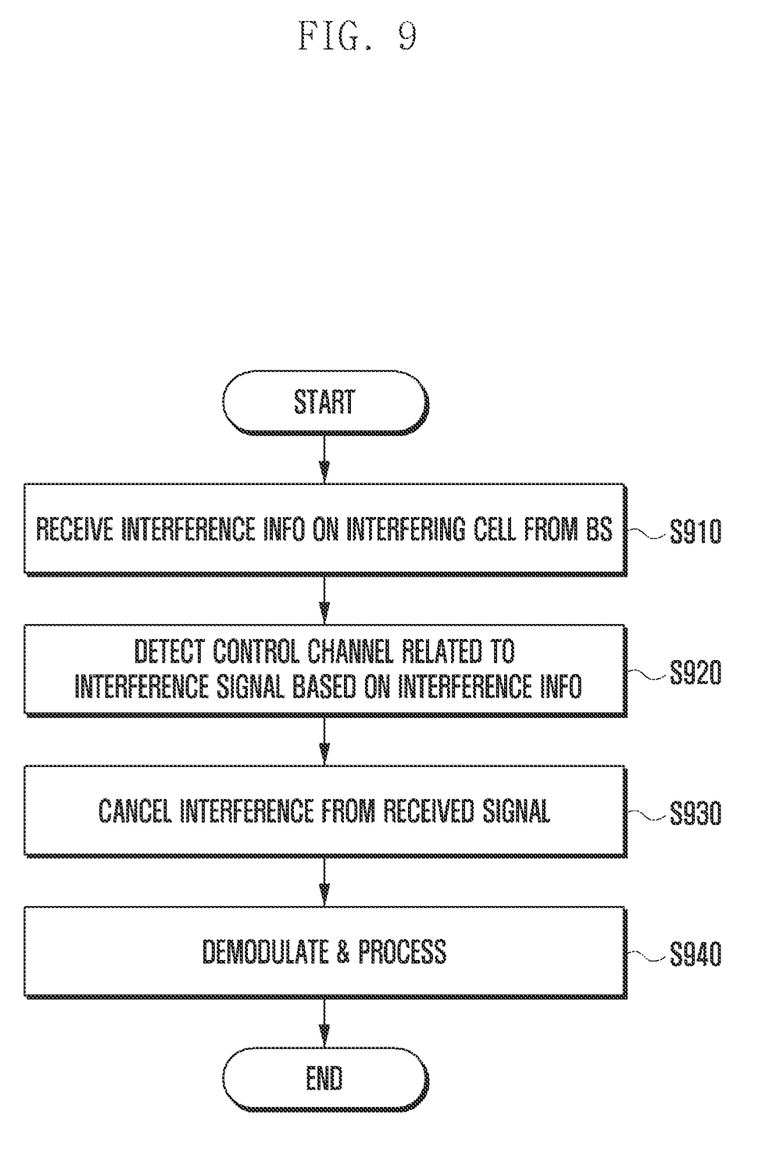
FIG. 9 is a flowchart illustrating a process for canceling interference by a UE according to an embodiment of the present disclosure.

FIG. 9 is a flowchart illustrating a process for canceling interference by a UE according to an embodiment of the present disclosure.

Referring to FIG. 9, the sequence of operations of the UE when the BS transmits only some of the acquired pieces of interference information to the UE are illustrated.

In operation S910, the UE receives the interference information on the interfering cell, from the BS. According to an embodiment of the present disclosure, the UE may receive the interference information from the BS through any one of the common control channel, the broadcast channel, and the dedicated channel.

In operation S920, the UE detects a control channel related to an interference signal based on the interference information received from the BS. After detecting the control channel, the UE may acquire at least one of a cell ID of the interference signal, modulation information, an RNTI, and RB allocation information.

Then, the UE proceeds to operation S930, and may cancel interference from the received signal based on the acquired interference information.

In operation S940, the UE may demodulate and process a serving signal thereof obtained by canceling the interference.

Figure 10:
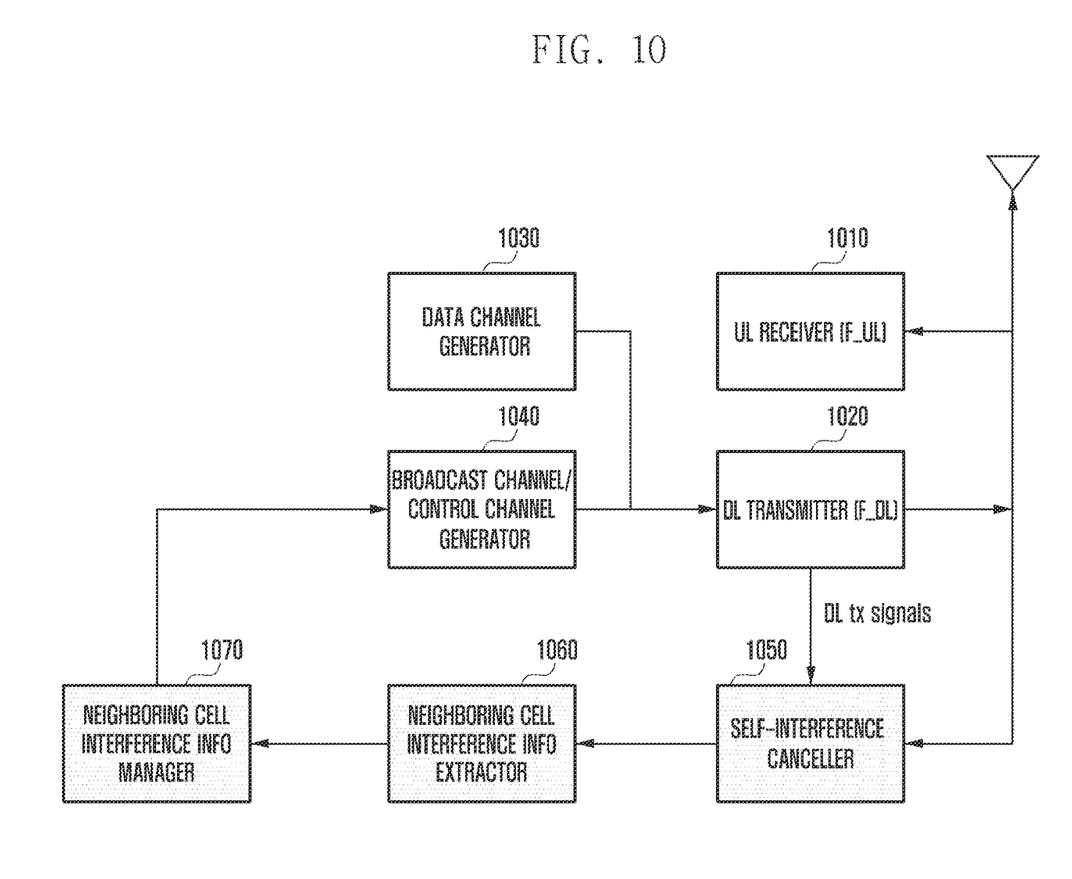
FIG. 10 is a block diagram illustrating an internal configuration of a BS according to an embodiment of the present disclosure.

FIG. 10 is a block diagram illustrating an internal configuration of a BS according to an embodiment of the present disclosure.

Referring to FIG. 10, the DL of the BS includes a data channel generator 1030 for generating a data channel, a broadcast channel/control channel generator 1040 for generating a control channel and a broadcast channel, and a DL transmitter 1020 for modulating the generated channel and transmitting the modulated channel at a DL frequency F_dl.

Also, the UpLink (UL) of the BS may include a UL receiver 1010 for receiving a UL signal transmitted by the UE.

A self-interference canceller 1050 receives information on a DL transmission signal from the DL transmitter 1020, cancels a self-interference signal from the received signal, and demodulates a neighboring cell interference signal.

A neighboring cell interference information extractor 1060 blind decodes or blind detects a control channel, and extracts information, such as a cell ID of an interference signal, an RNTI, and the like.

A neighboring cell interference information manager 1070 classifies multiple pieces of interference information according to a cell ID, a UE having an influence, and the like, and manages a database. Also, according to an embodiment of the present disclosure, the neighboring cell interference information manager 1070 may transmit the database to the UE through a DL wireless channel.

The internal configuration of the BS apparatus has been described on the premise that the BS apparatus includes multiple blocks and functions performed by the multiple blocks are different. However, the implementation of the BS is not limited to the configuration, in which the BS apparatus includes the multiple blocks. For example, it should be noted that the BS may include a transmitter/receiver for transmitting and receiving signals and a controller for controlling an operation of the BS, and that the controller may perform an operation performed by each block illustrated in FIG. 10.

Figure 11:
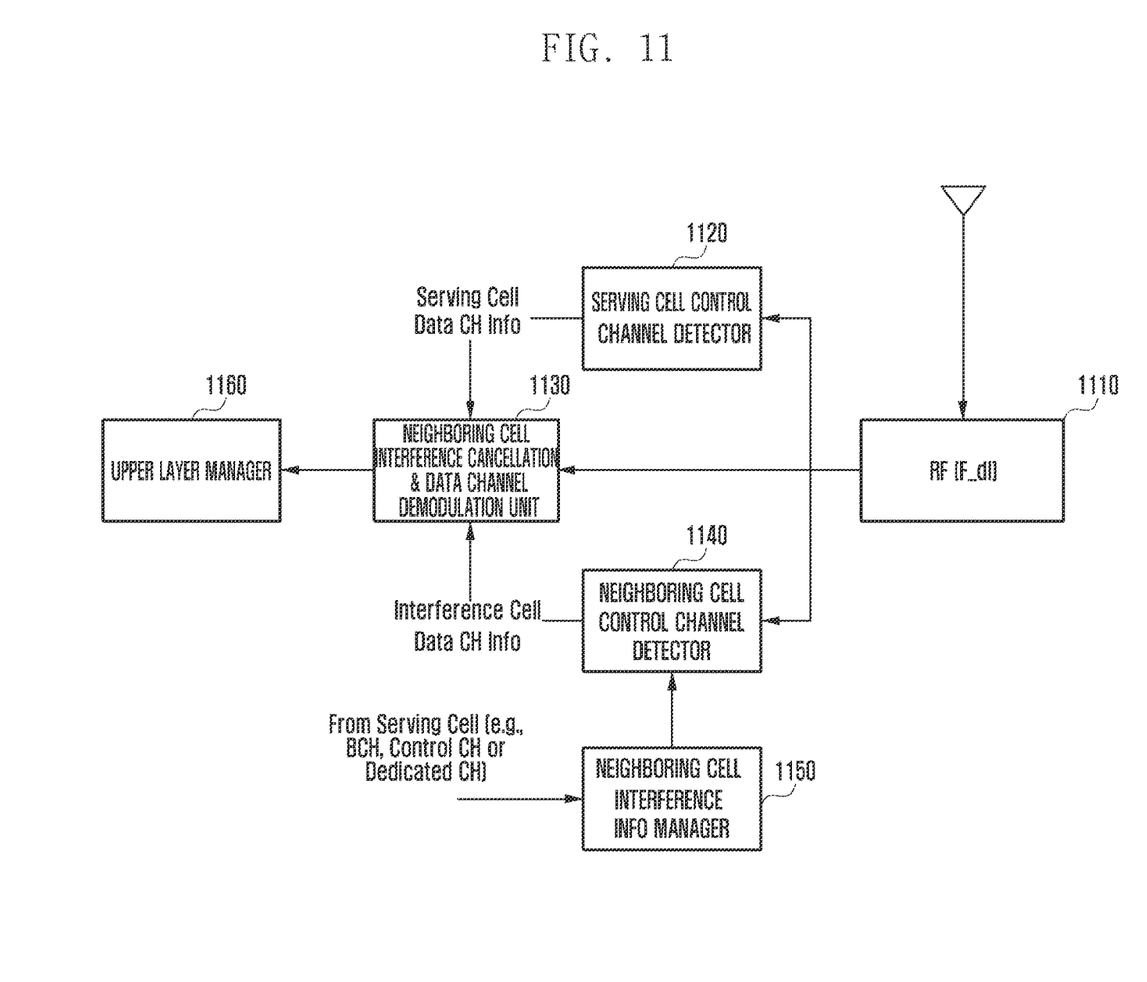
FIG. 11 is a block diagram illustrating an internal configuration of a UE according to an embodiment of the present disclosure.

FIG. 11 is a block diagram illustrating an internal configuration of a UE according to an embodiment of the present disclosure.

Referring to FIG. 11, a UE may include a Radio Frequency (RF) unit 1110 for receiving a DL signal transmitted at a center frequency F_dl, a serving cell control channel detector 1120 for monitoring whether the received signal including data on a target UE has been transmitted, and a data channel demodulator 1130 for modulating a data channel based on information on the data channel of the serving cell. In this case, in FIG. 11, a block for processing the demodulated data is illustrated as an upper layer manager 1160.

Also, according to an embodiment of the present disclosure, the UE may include a neighboring cell interference information manager 1150 for managing the interfering cell information received from the BS, a neighboring cell control channel detector 1140 for detecting a control channel related to an interference signal from the transmitted interference information, and a neighboring cell interference cancellation and data channel demodulation unit 1130 for canceling interference based on information on a data channel of the serving cell and information on a data channel of the interfering cell, and for demodulating a signal from the serving cell.

The internal configuration of the UE apparatus has been described on the premise that the UE apparatus includes multiple blocks and functions performed by the multiple blocks are different. However, the implementation of the UE is not limited to the configuration, in which the UE apparatus includes the multiple blocks. For example, it should be noted that the UE may include a transmitter/receiver for transmitting and receiving signals and a controller for controlling an operation of the UE, and that the controller may perform an operation performed by each block illustrated in FIG. 11.

According to the above-described embodiments of the present disclosure, because the BS acquires interference information between the BS and a neighboring cell and transmits the acquired interference information to the UE, the UE may effectively cancel interference at a cell edge area and the like, so that the system throughput of the entire wireless network may be significantly increased.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a base station (BS) of a cell in a wireless communication system for controlling interference, the method comprising:
receiving, from an adjacent BS of an adjacent cell, a first interfering cell signal;
canceling a downlink signal of the BS from the first interfering cell signal to generate a second interference cell signal;
acquiring interference information using control information, the control information being extracted from the second interfering cell signal based on a user equipment (UE) identifier, and the UE identifier being acquired as a result of a blind detection for the second interfering cell signal; and
transmitting the acquired interference information to a UE served by the BS,
wherein the acquired interference information is used for canceling an interference signal from a reception signal by the UE.

2. The method of claim 1, wherein the acquired interference information comprises at least one of:
a cell identifier (ID) of the interference signal;
modulation information;
the UE identifier; and
resource block (RB) allocation information.

3. The method of claim 1, wherein the transmitting of the acquired interference information comprises transmitting the acquired interference information to the UE through any one of a dedicated channel, a common control channel, and a broadcast channel.

4. The method of claim 1, further comprising classifying, after the acquiring of the interference information, the acquired interference information according to the UE that receives a service from the BS, and managing the classified interference information.

5. The method of claim 2, wherein the transmitting of the acquired interference information comprises transmitting, to the UE, at least one of the cell ID of the acquired interference signal, the modulation information, the UE identifier, and the RB allocation information.

6. A base station (BS) configured to control interference in a wireless communication system, the BS of a cell comprising:
a transceiver configured to transmit and receive signals to and from one of a neighboring BS and a user equipment (UE); and
a controller configured to:
receive, from an adjacent BS of an adjacent cell, a first interfering cell signal,
cancel a downlink signal of the BS from the first interfering cell signal to generate a second interference cell signal,
acquire interference information using control information, the control information being extracted from the second interfering cell signal based on a UE identifier, and the UE identifier being acquired as a result of a blind detection for the second interfering cell signal, and
transmit the acquired interference information to the UE served by the BS,
wherein the acquired interference information is used for canceling an interference signal from a reception signal by the UE.

7. The BS of claim 6, wherein the interference information comprises at least one of:
a cell identifier (ID) of the interference signal;
modulation information;
the UE identifier; and
resource block (RB) allocation information.

8. The BS of claim 6, wherein the controller is further configured to transmit the interference information to the UE through any one of a dedicated channel, a common control channel, and a broadcast channel.

9. The BS of claim 6, wherein the controller is further configured to:
cancel a third interfering cell signal transmitted by an interfering cell.

10. The BS of claim 6, wherein the controller is further configured to:
classify the acquired interference information according to the UE that receives a service from the BS, and
manage the classified interference information.

11. The BS of claim 7, wherein the controller is further configured to transmit, to the UE, at least one of the cell ID of the acquired interference signal, the modulation information, the UE identifier, and the RB allocation information.

12. At least one non-transitory processor readable medium for storing a computer program of instructions configured to be readable by at least one processor for instructing the at least one processor to execute a computer process for performing the method as recited in claim 1.

* * * * *